(12) United States Patent  
Jafarian et al.

(10) Patent No.: US 9,363,752 B2  
(45) Date of Patent: Jun. 7, 2016

(54) TARGET WAKE TIME FLOW IDENTIFICATION IN TWT ACKNOWLEDGEMENT

(71) Applicant: QUALCOMM Incorporated, San Diego, CA (US)

(72) Inventors: Amin Jafarian, Princeton, NJ (US); Alfred Asterjadhi, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/486,887

(22) Filed: Sep. 15, 2014

(65) Prior Publication Data

US 2015/0189592 A1    Jul. 2, 2015

Related U.S. Application Data

(60) Provisional application No. 61/921,405, filed on Dec. 27, 2013.

(51) Int. Cl.  
*G08C 17/00* (2006.01)  
*H04W 52/02* (2009.01)

(52) U.S. Cl.  
CPC .................................. *H04W 52/0216* (2013.01)

(58) Field of Classification Search  
None  
See application file for complete search history.

(56) References Cited

U.S. PATENT DOCUMENTS

| | | | | |
|---|---|---|---|---|
| 2004/0190467 A1* | 9/2004 | Liu | ........ | H04W 52/0216 370/311 |
| 2004/0253996 A1* | 12/2004 | Chen | ........ | H04W 52/0216 455/574 |
| 2005/0003794 A1* | 1/2005 | Liu | ........ | H04W 52/0216 455/355 |
| 2005/0018624 A1* | 1/2005 | Meier | ........ | H04L 29/12028 370/318 |
| 2013/0188541 A1* | 7/2013 | Fischer | ........ | H04W 52/0229 370/311 |
| 2013/0301502 A1* | 11/2013 | Kwon | ........ | H04W 52/0206 370/311 |
| 2014/0133376 A1* | 5/2014 | Ghosh | ........ | H04W 52/0216 370/311 |
| 2014/0135051 A1* | 5/2014 | Ghosh | ........ | H04W 52/0206 455/517 |
| 2014/0161010 A1* | 6/2014 | Merlin | ........ | H04W 52/0235 370/311 |
| 2014/0247780 A1* | 9/2014 | Jafarian | ........ | H04W 72/0446 370/329 |
| 2014/0293850 A1* | 10/2014 | Huang | ........ | H04W 52/0225 370/311 |
| 2014/0313952 A1* | 10/2014 | Ghosh | ........ | H04L 1/00 370/311 |
| 2014/0334365 A1* | 11/2014 | Jafarian | ........ | H04W 52/0225 370/311 |
| 2014/0355434 A1* | 12/2014 | Jafarian | ........ | H04W 28/12 370/230.1 |
| 2015/0036670 A1* | 2/2015 | Park | ........ | H04W 52/0225 370/338 |
| 2015/0124677 A1* | 5/2015 | Asterjadhi | ........ | H04L 1/0025 370/311 |

FOREIGN PATENT DOCUMENTS

WO    WO-2013106758 A1    7/2013

OTHER PUBLICATIONS

International Search Report and Written Opinion—PCT/US2014/068277—ISA/EPO—Feb. 26, 2015.  
Wong E. et al., "Proposed TGah Draft Amendment"; IEEE P802.11 Wireless LANs; IEEE-SA Mentor, Piscataway, NJ USA, doc.: IEEE 802.11-13/0500R0, May 10, 2013, pp. 1-330, XP068054010.

\* cited by examiner

*Primary Examiner* — Anh-Vu Ly

(57) ABSTRACT

Certain aspects of the present disclosure provide methods and apparatus for generating a frame with timing information for a target wake time (TWT) and an identification of the TWT. An example method generally includes generating a frame generating a frame comprising timing information for a target wake time (TWT) and an identification of the TWT to which the timing information applies, and outputting the frame for transmission.

28 Claims, 9 Drawing Sheets

TARGET WAKE TIME FLOW IDENTIFICATION IN TWT ACKNOWLEDGEMENT

CROSS-REFERENCE TO RELATED APPLICATIONS

The present application claims priority to U.S. Provisional Application No. 61/921,405, filed Dec. 27, 2013, which is assigned to the assignee of the present application and the contents of which are hereby incorporated by reference in its entirety.

BACKGROUND

1. Field

Certain aspects of the present disclosure generally relate to wireless communications and, more particularly, to target wake time message identification.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus typically includes a processing system generally configured to generate a frame comprising timing information for a target wake time (TWT) and an identification of the TWT to which the timing information applies and an interface configured to output the frame for transmission.

Certain aspects of the present disclosure provide a method for wireless communications. The method generally includes generating a frame comprising timing information for a target wake time (TWT) and an identification of the TWT to which the timing information applies, and outputting the frame for transmission.

Certain aspects of the present disclosure provide an apparatus for wireless communications. The apparatus typically includes an interface generally configured to receive a frame and a processing system generally configured to obtain, from the frame, timing information for a target wake time (TWT) and an identification of the TWT to which the timing information applies, and update a wakeup period for the identified TWT based on the timing information obtained from the frame.

Certain aspects of the present disclosure provide a method for wireless communications. The method generally includes receiving a frame, obtaining, from the frame, timing information for a target wake time (TWT) and an identification of the TWT to which the timing information applies, and updating a wakeup period for the identified TWT based on the timing information obtained from the frame.

Certain aspects of the present disclosure also provide various apparatus, methods, and computer program products for performing the operations described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
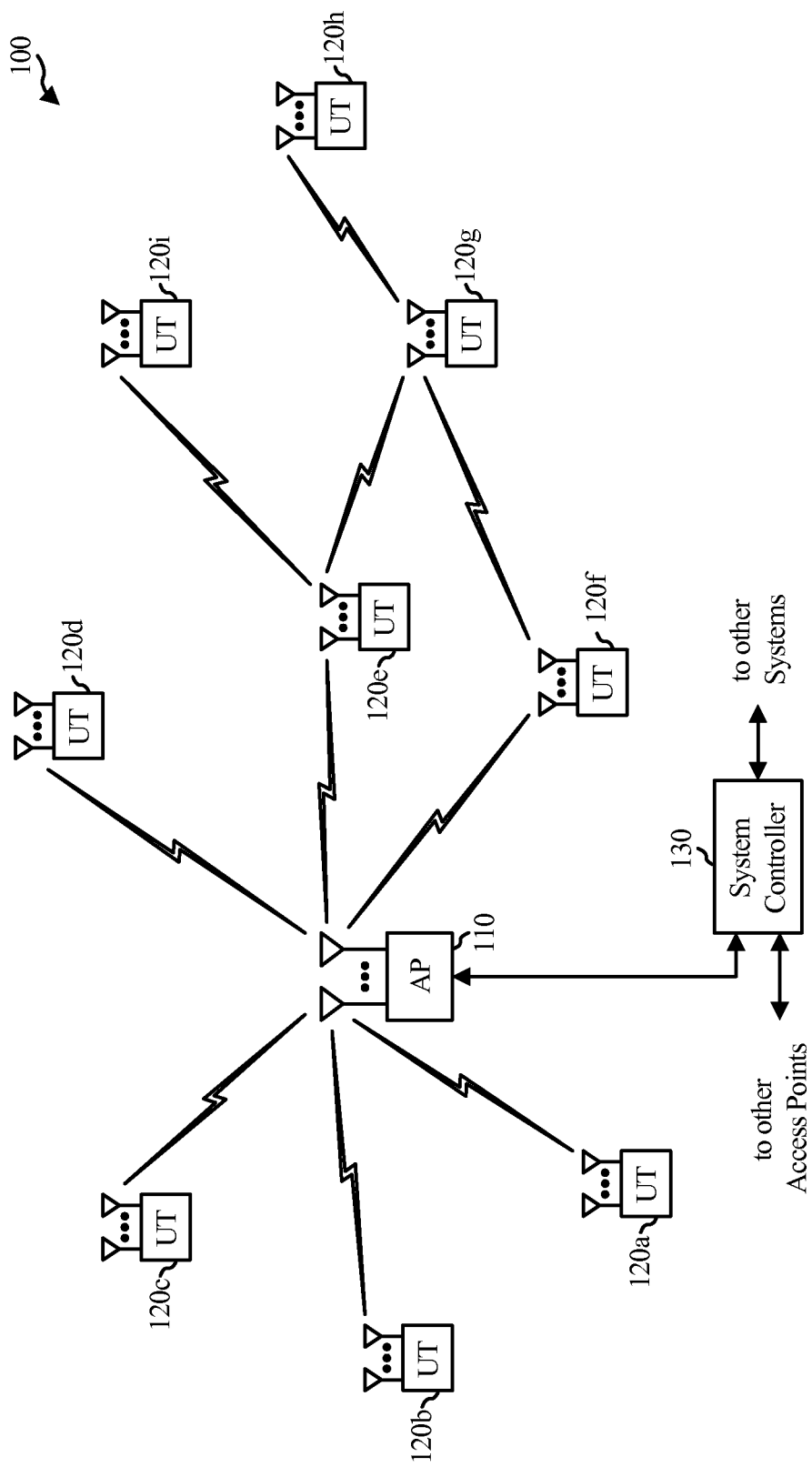
FIG. 1 illustrates a diagram of an example wireless communications network, in accordance with certain aspects of the present disclosure.

According to certain aspects of the present disclosure, the inclusion of target wake-up time (hereinafter "TWT") information in a frame may allow a station to be informed of when the station should wake up to receive data transmissions, and thus enables power savings by allowing a station to sleep until a TWT. Multiple TWT flows may be assigned to a station, which may result in difficulties in indicating for which TWT flow a next TWT is assigned outside of a TWT service period. Aspects of the present disclosure provide for including an indication of a particular TWT flow being signaled, which may allow for the ability to set TWTs outside of predefined time periods.

Aspects of the present disclosure provide enhancements to mechanisms involving certain selective transmission mechanisms, such as target wake-up times (TWTs) and restricted access windows (RAWs). By providing an indication of a particular TWT flow being signaled, support for explicit TWT signaling outside of predefined services periods may be provided.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

FIG. 1 illustrates a multiple-access multiple-input multiple-output (MIMO) system 100 with access points and user terminals in which aspects of the present disclosure may be practiced. For example, access point (hereinafter "AP") 110 may be configured to perform or direct operations 800 in FIG. 8 to generate and transmit a frame comprising time information for an indicated TWT. User terminals (hereinafter "UT") 120 may be configured to perform or direct operations 900 in FIG. 9 to receive a frame comprising time information for an indicated TWT and accordingly update a waiting period for the indicated TWT.

For simplicity, only one access point 110 is shown in FIG. 1. An access point AP may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. As used herein, the term AP generally refers to a station that communicates with the user terminals and may also be referred to as a base station or some other terminology.

A user terminal may be fixed or mobile and may comprise, be implemented as, or known as a subscriber station, a subscriber unit, a mobile station (MS), a remote station, a remote terminal, an access terminal (AT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

AP 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
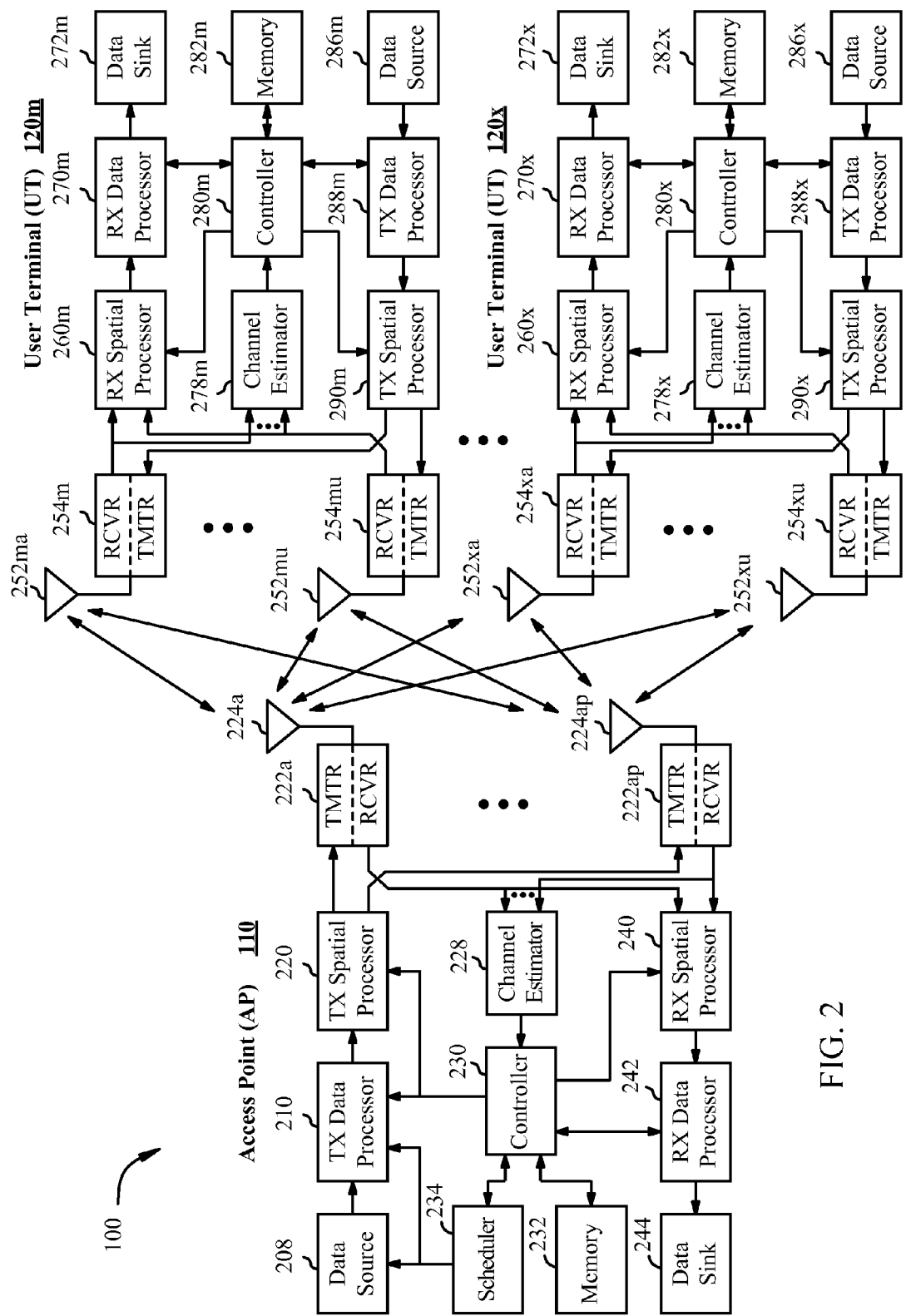
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
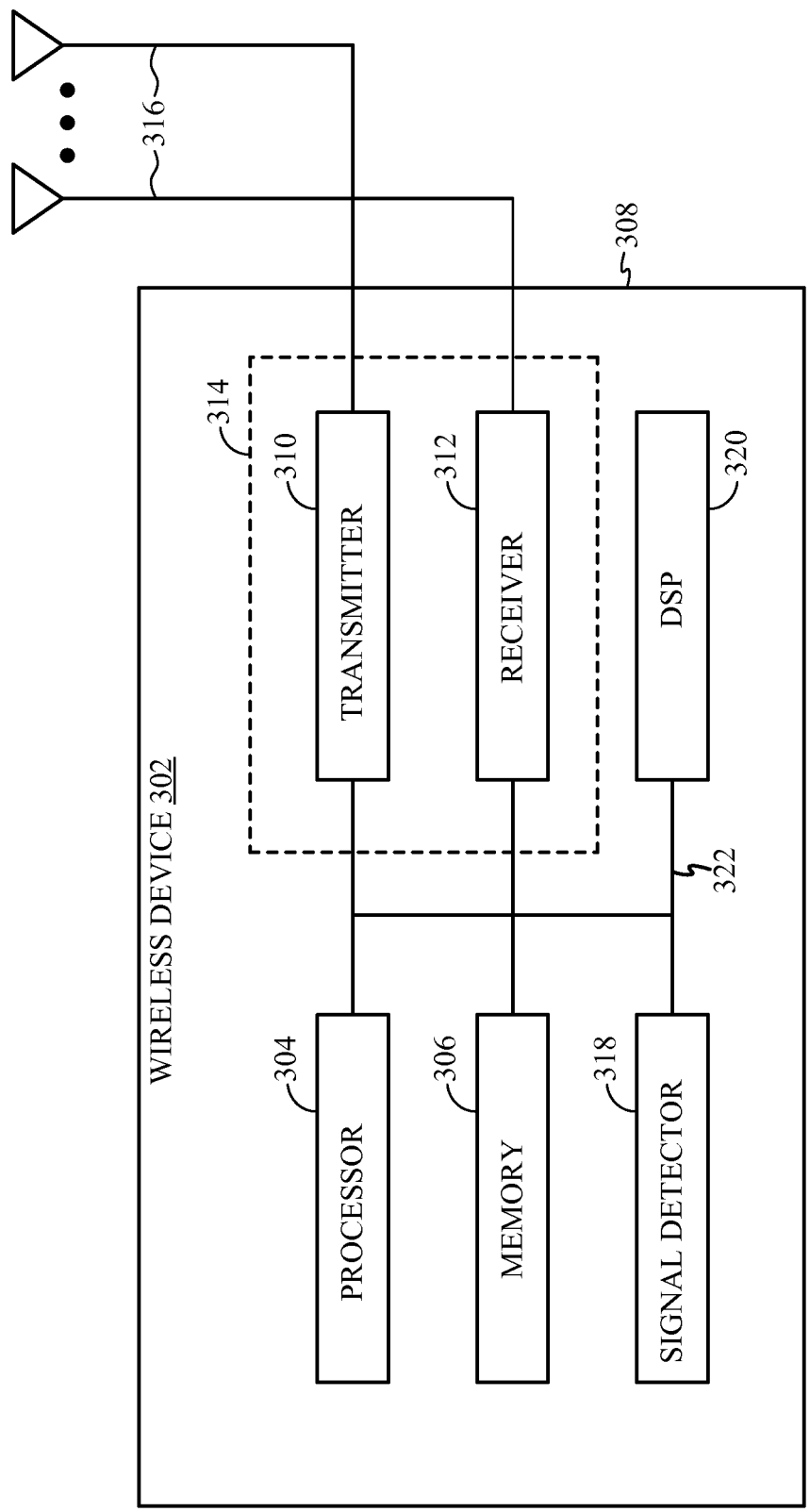
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable (e.g., by processor 304) to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Target Wake Time Flow ID Signaling

In a wireless communications system, it may be desirable to allow devices to enter a low power mode (e.g., sleep with one or more components powered down) whenever possible to reduce power consumption. Further, to keep costs down, it may be desirable to use devices with only limited memory. Thus, a device may be able to buffer only a small amount of data, and may need to forward the data before being able to receive more.

Figure 4:
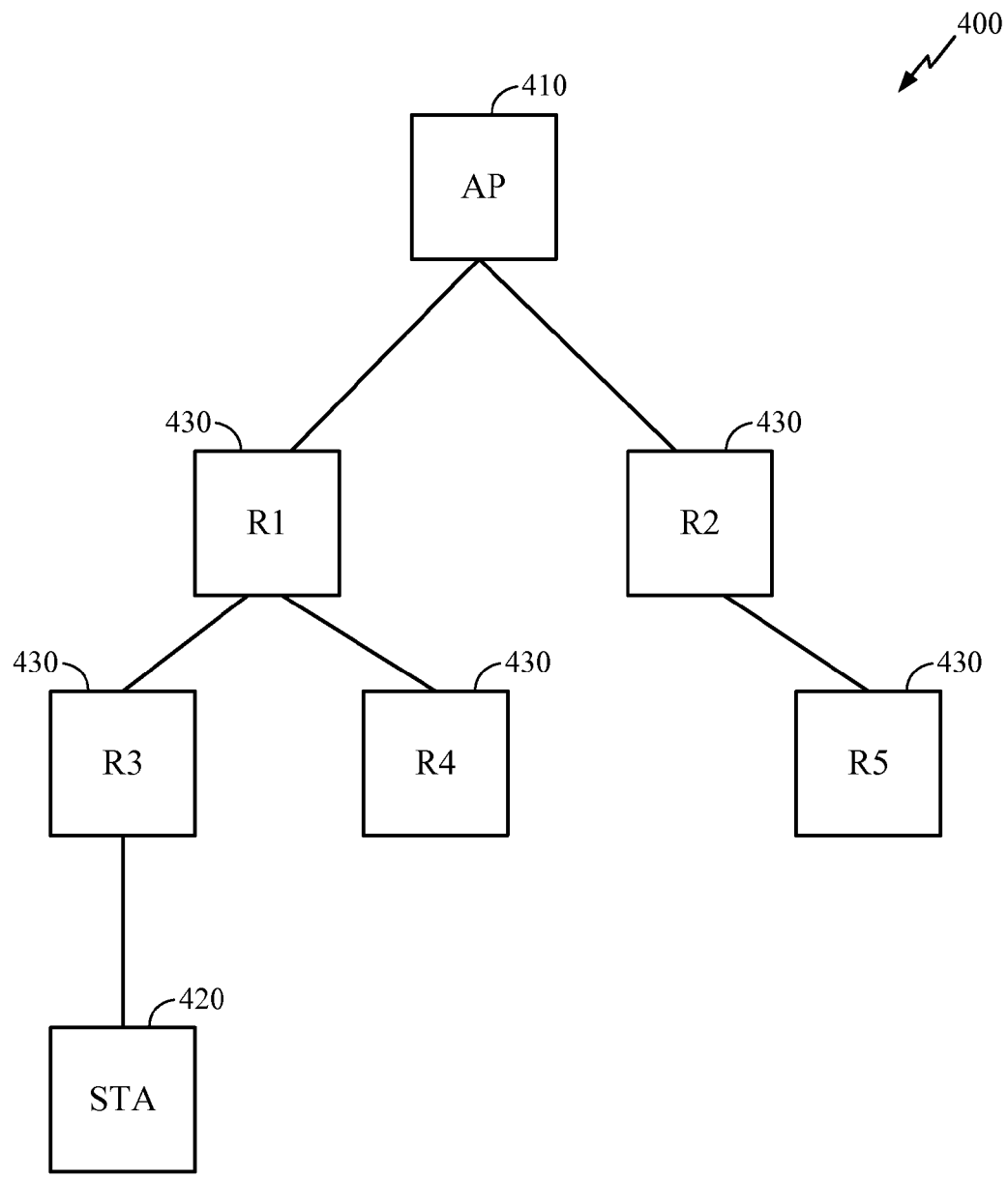
FIG. 4 illustrates an example tree structure of a relay system, in accordance with certain aspects of the present disclosure.

For example, devices for which it may be desirable to allow devices to enter a lower power mode may include devices such as relays or various other types of equipment (e.g., user equipments or stations). In a wireless communications system, such as that shown in FIG. 4, this may present some challenges on how to conserve power- and still ensure devices are awake at appropriate times to receive and/or transmit data. In general, all relays 430 (R1-R5) between an AP 410 and a leaf STA 420 may need to be able to exit a low power state (awaken) quickly, in order to transmit (relay) data in small chunks. For stations, such as STA 420, similar challenges on conserving power and exiting a lower power state to receive data may be presented.

Techniques presented herein may be considered part of a power savings protocol that allows devices to conserve power and operate with limited amount memory.

As will be described in greater detail below, devices such as a relay node or other user equipment may also be configured to enter a low power state (e.g., a sleep mode with radio components powered down) in order to conserve battery power. In some cases, a relay node may be configured with scheduled wakeup periods, during which the relay node may transmit and receive data. To conserve power, however, rather than exit the low power state each wakeup period, a relay may decide to exit the low power state only when one or more conditions are met (e.g., when there has been an indication there is data for the relay node to transmit or receive).

In general, an AP and STA may perform similar (e.g., symmetric or complementary) operations. Therefore, for many of the techniques described herein, an AP or STA may perform similar operations. To that end, the following description will sometimes refer to an "AP/STA" to reflect that an operation may be performed by either. Although, it should be understood that even if only "AP" or "STA" is used, it does not mean a corresponding operation or mechanism is limited to that type of device.

Figure 5:
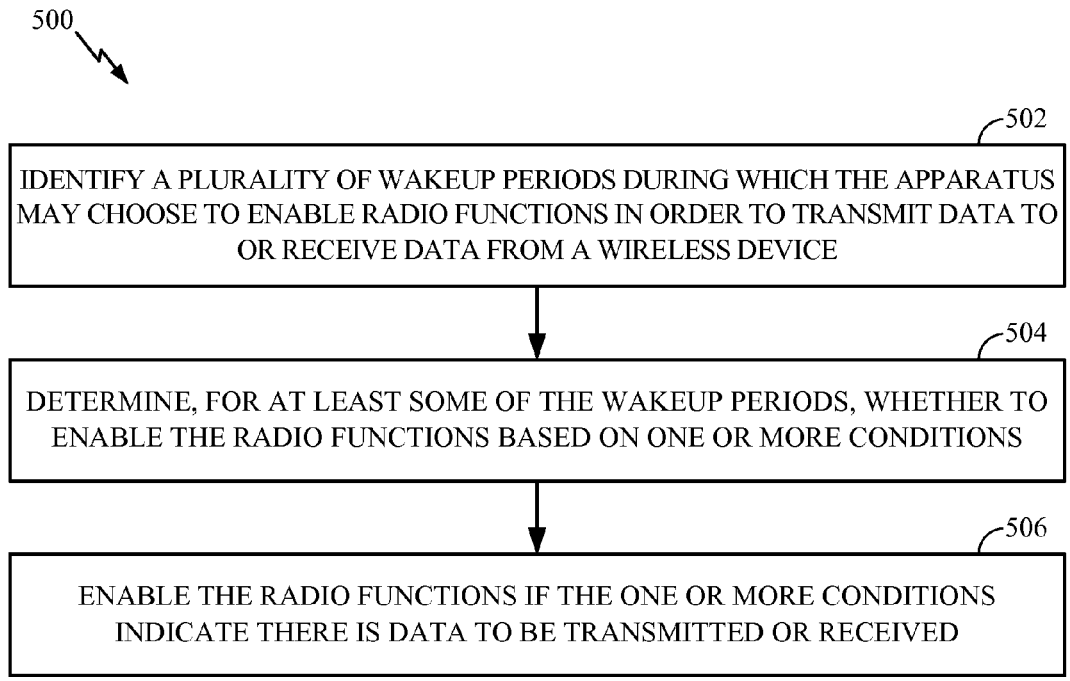
FIG. 5 illustrates a block diagram of example operations for wireless communications by a wireless device, in accordance with certain aspects of the present disclosure.

FIG. 5 is a block diagram of example operations 500 for utilizing hierarchical wakeup periods, in accordance with aspects of the present disclosure. The operations 500 may be performed by an apparatus, such as a station, which may act as an endpoint station or as a relay.

At 502, the apparatus identifies a plurality of wakeup periods during which the apparatus may choose to enable radio functions in order to transmit data to or receive data from a wireless device. At 504, the apparatus determines, for at least some of the wakeup periods, whether to enable the radio functions based on one or more conditions. At 506, the apparatus enables the radio functions if the one or more conditions indicate there is data to be transmitted or received.

Figure 6:
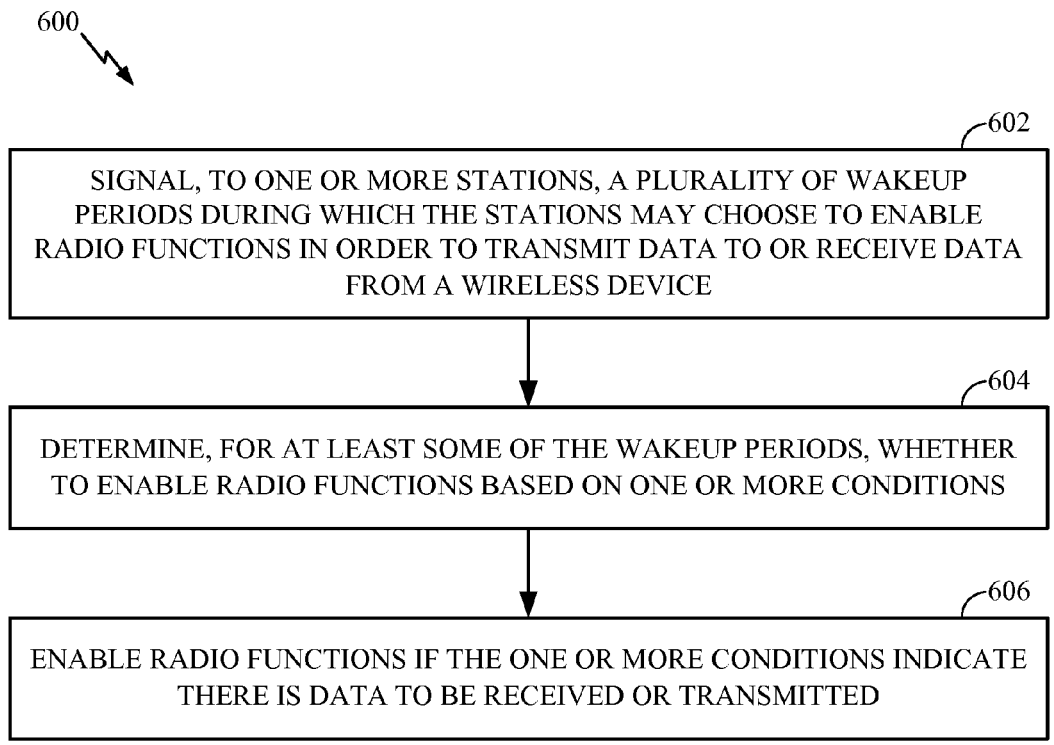
FIG. 6 illustrates a block diagram of example operations for wireless communications by an access point, in accordance with certain aspects of the present disclosure.
Figure 5A:
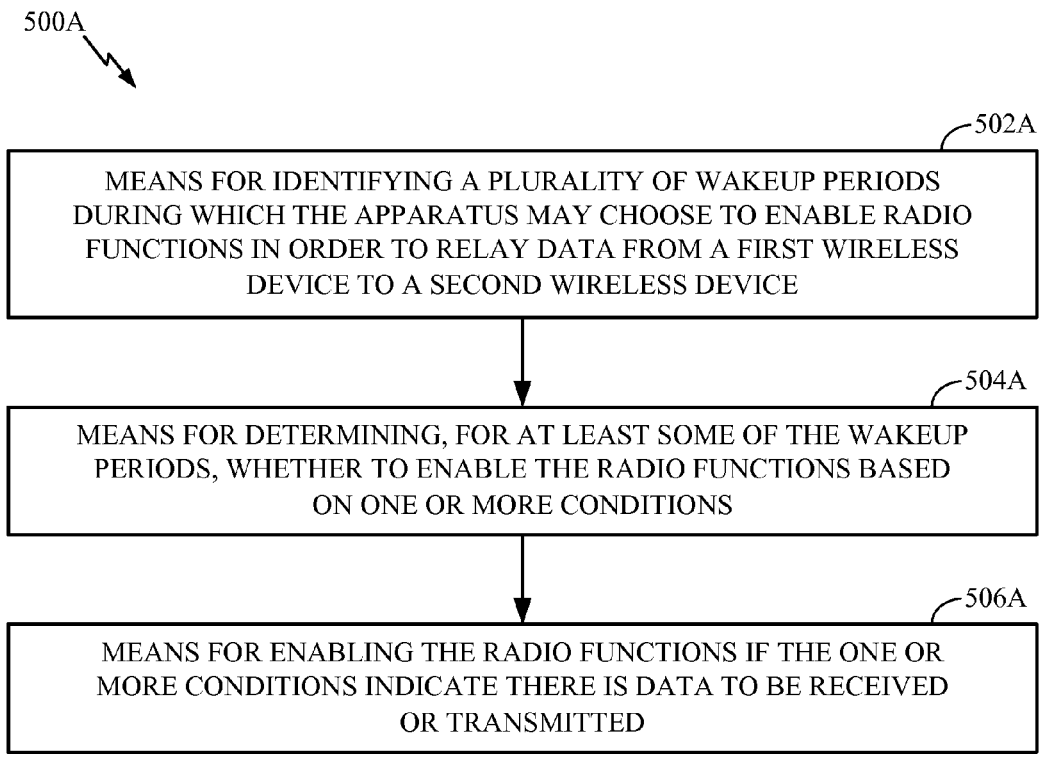
FIG. 5A illustrates example means capable of performing the operations shown in FIG. 5.
Figure 6A:
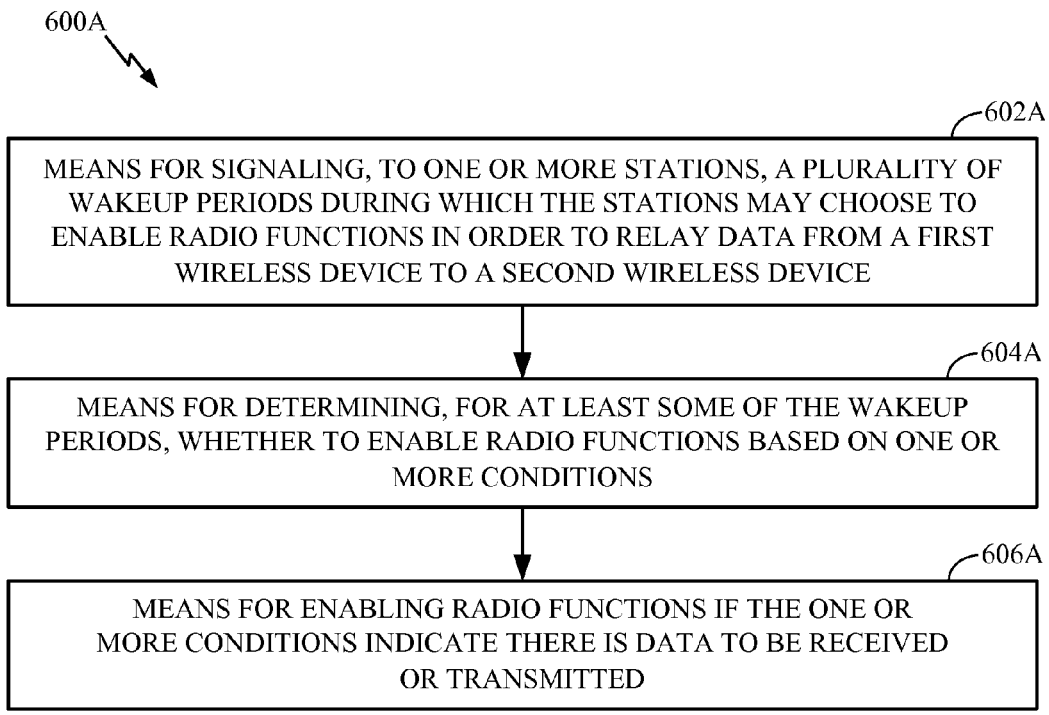
FIG. 6A illustrates example means capable of performing the operations shown in FIG. 6.

FIG. 6 is a block diagram of example operations 600 for utilizing hierarchical wakeup periods, in accordance with aspects of the present disclosure. The operations 600 may be performed by an apparatus, such as a station, acting as an access point.

At 602, the apparatus signals, to one or more stations, a plurality of wakeup periods during which the stations may choose to enable radio functions in order to transmit data to or receive data from a wireless device. At 604, the apparatus determines, for at least some of the wakeup periods, whether to enable radio functions based on one or more conditions. At 606, the apparatus enables radio functions if the one or more conditions indicate there is data to be received or transmitted.

Figure 7:
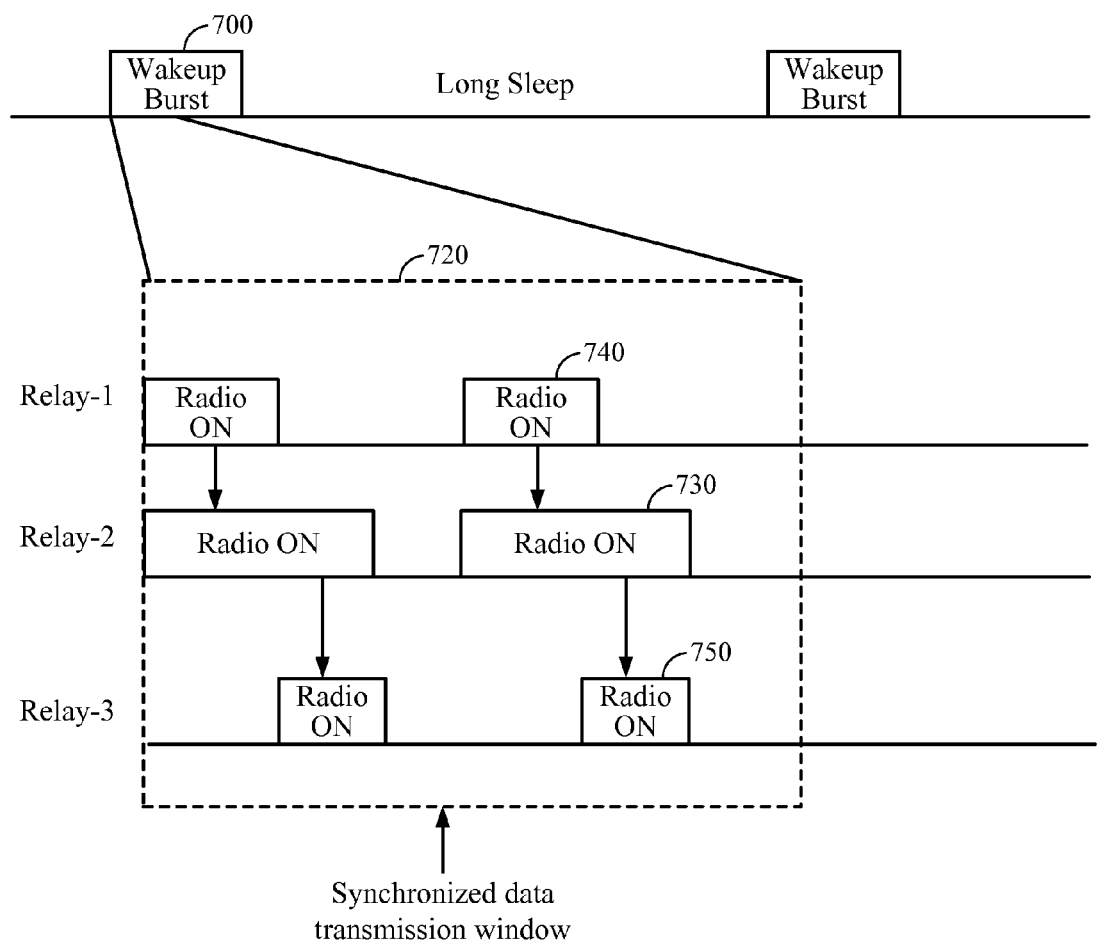
FIG. 7 illustrates an example use of hierarchical wakeup periods, in accordance with aspects of the present disclosure.

FIG. 7 is an example timing diagram illustrating the general idea of a proposed timing scheme in accordance with aspects of the present disclosure. As illustrated, within a wakeup burst 700, small chunks of data may be sent to a relay, and the relay immediately forwards them. The long sleep may be in the order of multiple seconds (e.g., up to 10 seconds or more). A wake-up burst may be in the order of multi-100 ms (e.g., 500 ms), while each "radio on" period (730, 740 and 750) may be in the order of tens of ms. To conserve power, Relay/STAs may be configured to not wakeup for the wakeup burst if there is no data to be forwarded/received.

The wakeup burst 700 may correspond to any determined wakeup period, such as a configured (periodic) TWT or a restricted access window (RAW). For downlink (DL) TWT, a STA1 may ask another AP to agree on a time when STA1 need be awake at least for a minimum amount of time. The AP can use that time to start a transmission to STA1. An Uplink (UL) TWT may operate in a similar manner, but the other way around, with a station using that time to start a transmission to the AP. In some cases, TWTs may occur periodically.

Unfortunately, with conventional TWT configurations, both the STA/AP is awake at each TWT even in the absence of traffic. In the event there is no traffic, this results in a needless waste of power. According to certain aspects, presented herein, however, various rules may be designed to control the use of a TWT. This may allow the definition of an adaptive power saving schedule.

For example, in order to conserve power, rather than exit a low power state with every wakeup period (e.g., TWT), the behavior of a STA/AP at the TWT (or other wakeup period) may be dependent on additional conditions. For example, a TWT may be in effect (meaning the device wakes up) only if additional conditions are fulfilled, otherwise AP/STA can sleep. For example, DL TWT may be in effect only if there is data for the STA, as indicated at a previous time (e.g. in Beacon or ULP or other type message of a previous TWT). Similarly, UL TWT may be in effect only if there is data for the AP from the STA, as indicated at a previous time (e.g. in a Primary TWT as will be described below).

In some cases, 2 types of TWTs may be defined: a Primary type and a Secondary type, with the following rules regarding dependency. In some cases, a STA may be required to be awake at a Primary TWT. For a Secondary TWT, on the other hand, the STA/AP may only be required to be awake if a certain event happens at the primary TWT. Otherwise, the STA/AP can sleep at the Secondary TWT. For a DL TWT (e.g., for data transmission to a STA), a suitable condition may be that the AP indicated in the Primary TWT that there is Data or More Data for the STA. For an UL TWT, a suitable condition may be that the STA indicated in the primary TWT that it has more UL data to send.

According to certain aspects, the Primary TWT may be defined by periodic wakeups and the Secondary TWTs may be "on demand" based on whether or not there are more bufferable units (hereinafter "BUs") of data. The serving STA can send info about the next TWT, potentially using existing frames like Block Acknowledgment TWT (hereinafter "BAT"), Short TWT Acknowledgment (hereinafter "STACK") or TWT Acknowledgment (hereinafter "TACK"), in the current TWT, starting from the Primary TWT. As an example, if there are unicast BUs at the AP for STA1, the AP may try to send all of them in the next periodic Primary TWT. However, if the Primary TWT time is insufficient to send all the BUs, the AP may send an indication of the next "on demand" TWT, for example, signaling a station should wake up on the indicated TWT to receive the rest of the BUs to be transmitted. Signaling of an "on demand" TWT may be repeated, as necessary, until all packets are sent. At the end, STA1 will know there are no more "on demand" TWTs either implicitly (e.g., the AP will not send the "next TWT" indication anymore) or explicitly (e.g., the AP may send an "end of on demand TWTs" frame to the STA). In either case, the STA can sleep until the next period of the Primary TWT.

According to certain aspects, there may be multiple Secondary TWTs per Primary TWT, for example, with each Secondary TWT linked to its Primary TWT (e.g., by an identifier). Which Secondary TWT is in effect (meaning a STA will wake up for that TWT) may be based on events happening at the time of the Primary TWT. For example, an AP may indicate there is unicast data for a STA and use a first (type of) Secondary TWT (e.g., TWT 1), while the AP may indicate there is multicast data and use a second (type of) Secondary TWT (e.g., TWT 2). According to certain aspects, Primary and Secondary(s) TWT may be defined at once in a single information element (hereinafter "IE"). In some cases, the IE may indicate if the TWT is a Primary or Secondary TWT.

In some cases, the periodic interval of Primary and Secondary TWTs may be different. Moreover, in some cases, the Secondary TWTs may start with an offset with respect to the Primary TWT. This may allow propagation of the Primary TWT down multiple relay stations. If the Primary TWT is used to wakeup relay/STAs, this may allow for a wakeup all relays before data is started in the Secondary TWTs. Moreover, to limit the amount of data transferred at each TWT, a STA/AP may indicate a maximum number of bytes, or MSDUs (Media Access Control (MAC) Service Data Units), or MPDUs (MAC Protocol Data Units), or PPDUs (Physical Layer Convergence Protocol (PLCP) Protocol Data Units) that the STA/AP will accept at each TWT. As an alternative, the STA/AP may indicate a maximum amount of time it will be awake at each TWT. Secondary TWTs may be in effect, until no more data is available to be transferred (which may be indicated, for example, by More Data=0 in MAC header).

In some cases, according to a first TWT option (e.g., option 1), a transmitter may expect a 'Poll' before delivering data. This approach is useful if the receiver STA wants to be in control of its awake cycle, as the expectation of receiving a Poll before delivering data may obviate the need for Preferred TWTs, and may be useful if the receiver STA wants to be in control of how much data to receive (e.g., only 1 MPDU per PS-Poll or only a max number of MPDUs per trigger frame). A transmitter (e.g. AP) may then need to wake up at each TWT where a poll could be received.

According to a second TWT option (e.g., option 2) a transmitter may send data without waiting for a Poll. This approach may have less overhead, but may also require a receiver to be awake at each TWT where there could be data. As an alternative, a transmitter could first send a short data frame with a More Data field set to 1 (i.e., indicating that more data is available to be transferred) to test if STA is awake. The transmitter can sleep whenever it does not have data to send.

Assuming TWT option 1 (e.g., where a receiver uses a Poll to poll for data), for TIM (Traffic Indication Map) STAs (i.e., STAs that can read the beacon to see if data is available for transmission to the STA), it may be expected that TIM STAs read first either a beacon or an uplink page (hereinafter "ULP") which was separately setup. According to the techniques proposed herein, the STA should not send PS-Poll (or trigger frame) unless it knows there are BUs from reading a previous Beacon/ULP.

The PS-Poll (or trigger frame) may be sent immediately after the Beacon/TWT, with contention, if it is assumed that the AP is sleeping. The STA may then wait for the next TWT. A PS-Poll may also be sent in a RAW for paged STAs or in the next TWT for DL or in the next TWT for UL using a trigger frame.

For non-TIM STAs (e.g., STAs that do not read the beacon, and just poll the AP to see if there is data), a "Primary" DL TWT may be defined such that a STA sends PS-Poll (or trigger frame) at a primary TWTs. If ACK to PS-Poll indicates no data, STA goes back to sleep and tries again at the next Primary TWT. Otherwise, the AP may respond directly with data or indicating that data will be sent and STA can keep using TWTs until transmission of the data is completed. If no data is indicated, Secondary TWTs need not be in effect.

Figure 8:
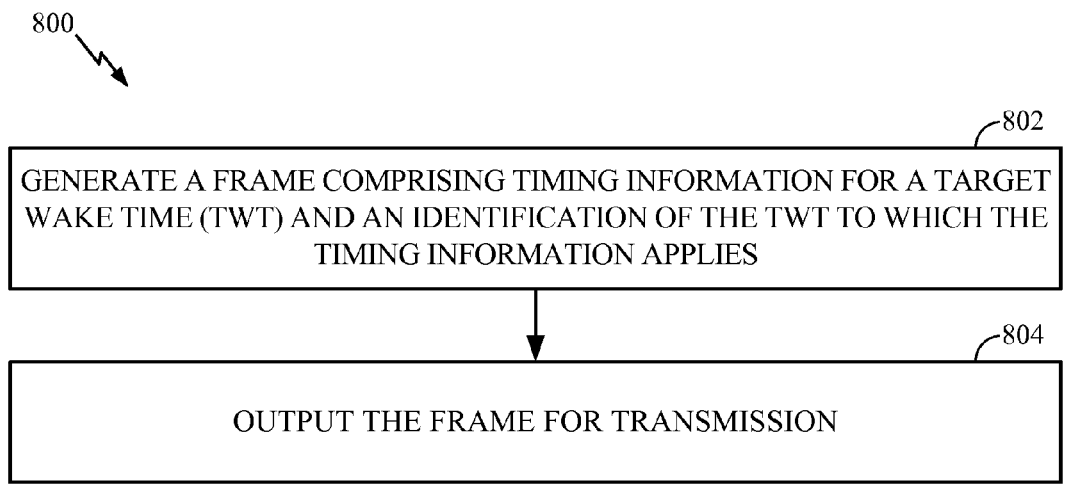
FIG. 8 illustrates a block diagram of example operations for wireless communications, in accordance with certain aspects of the present disclosure.
Figure 8A:
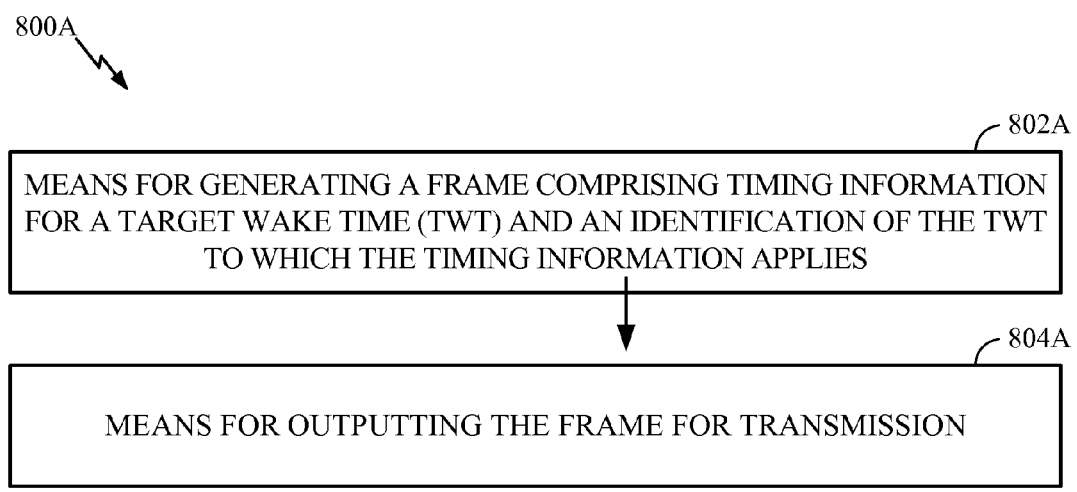
FIG. 8A illustrates example means capable of performing the operations shown in FIG. 8.

FIG. 8 is a block diagram of operations 800 for transmitting a frame containing target wake time information, in accordance with aspects of the present disclosure. The operations 800 may be performed by an apparatus, such as a station, acting as a transmitter.

Operations 800 may begin at 802, where the apparatus may generate a frame comprising timing information for a TWT and an identification of the TWT to which the timing information applies. At 804, the apparatus outputs the frame for transmission to a recipient station.

Figure 9:
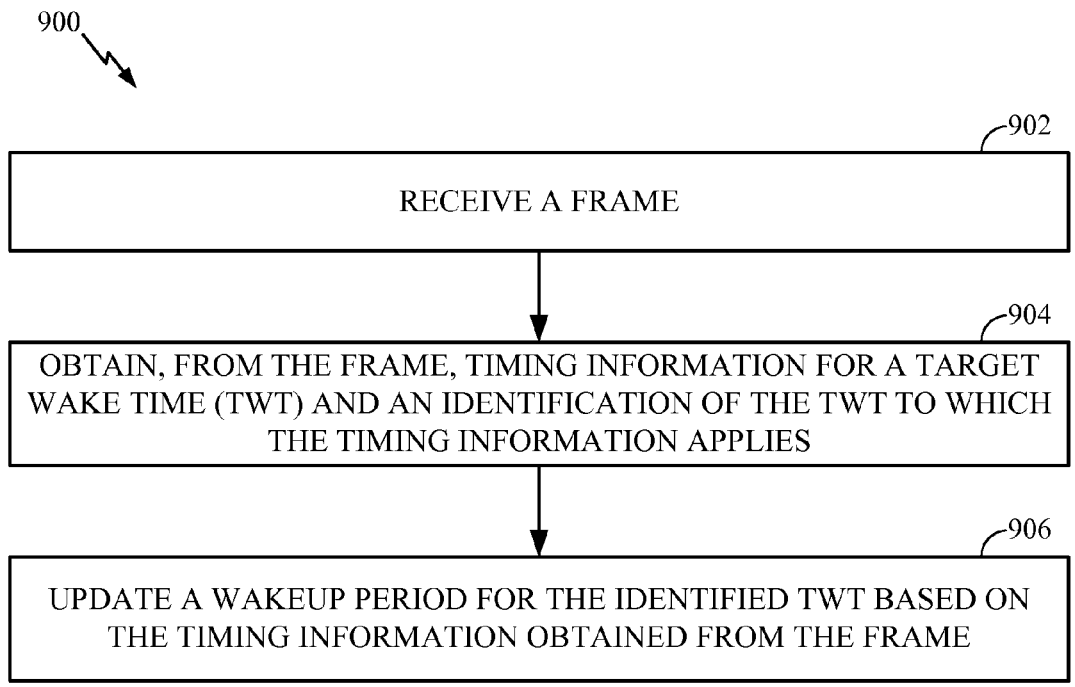
FIG. 9 illustrates a block diagram of example operations for wireless communications, in accordance with certain aspects of the present disclosure.
Figure 9A:
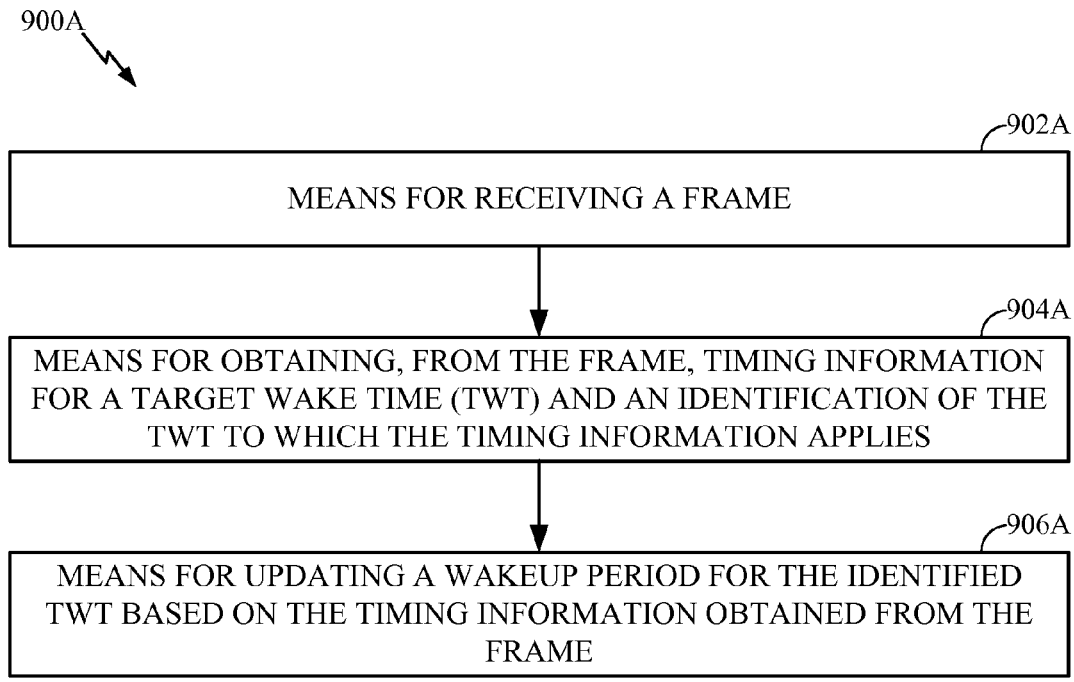
FIG. 9A illustrates example means capable of performing the operations shown in FIG. 9.

FIG. 9 is a block diagram of operations 900 for receiving a frame containing target wake time information, in accordance with aspects of the present disclosure. The operations 900 may be performed by an apparatus, such as a station, acting as a receiver.

Operations 900 may begin at 902, where the apparatus receives a frame. At 904, the apparatus obtains, from the frame, timing information for a TWT and an identification of the TWT to which the timing information applies. At 906, the apparatus updates a wakeup period for the identified TWT based on the timing information obtained from the frame.

Various frames may contain a field indicating the next TWT. Typically, an access point can transmit a frame during a TWT service period to enable wireless devices connected to the access point to determine which TWT is being addressed by the frame when more than one TWT is negotiated between wireless devices.

According to certain aspects of the present disclosure, an access point may generate a frame comprising an identification of a specific TWT that is being addressed. In some cases, the frame containing TWT information may be a control response frame. The control response frame may, for example, be a TACK, STACK, or BAT frame.

The identification can comprise a number of bits commensurate with the number of discrete TWTs supported; for example, where eight discrete TWTs may be supported, the identification may comprise at least three bits. The TWT identification can be placed in a variety of fields. For example, a TWT identification can be transmitted in its own field or in an existing field (e.g., an address field in a control response frame (e.g., the Address 1 (A1) field), a recipient address (RA) field, a transmitter address (TA) field, a duration field, a pentapartial timestamp field, or a next TWT field). A TWT identification may span multiple fields or be contained in a subfield within a field. For example, a TWT identification can be provided in a TWT Flow Identifier subfield, which may be a subfield of an A1 field in a control response frame. TWT identifications may be placed within the most significant bits or the least significant bits of a frame containing TWT information. For example, the TWT identification may be contained as a number of bits within a field containing TWT timing information.

Frames containing TWT information and an identification of a particular TWT can be transmitted during TWT service periods or outside of TWT service periods. Regardless of whether TWT information is transmitted during TWT service periods or outside of TWT service periods, TWT identification information can be used by a wireless device to determine a mapping between a TWT ID and a particular TWT period.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500, 600, 800, and 900 illustrated in FIGS. 5, 6, 8, and 9 correspond to means 500A, 600A, 800A, and 900A illustrated in FIGS. 5A, 6A, 8A, and 9A, respectively.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, means for detecting, means for scanning, means for selecting, or means for terminating operation may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions) described above for performing fast association. For example, means for identifying wakeup periods may be implemented by a processing system performing an algorithm that identifies wakeup periods based on a configuration (e.g., via an IE), means for determining whether to enable radio functions during wakeup periods may be implemented by a (same or different) processing system performing an algorithm that takes, as input, the wakeup periods and whether the presence of data has been indicated, while means for enabling radio functions may be implemented a (same or different) processing system performing an algorithm that takes, as input, the decision from means for determining and generates signals to enable/disable the radio functions accordingly.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to:
generate a frame comprising timing information for a target wake time (TWT) and an identification of the TWT to which the timing information applies; and
an interface configured to output the frame for transmission, wherein the frame is output for transmission outside a previously indicated service period for the TWT identified by the identification.

2. The apparatus of claim 1, wherein the identification is provided via one or more bits of at least one of an address field, a timestamp field, or a field that carries timing information for a TWT in the frame.

3. The apparatus of claim 1, wherein the frame comprises a control response frame.

4. The apparatus of claim 3, wherein the control response frame comprises a TWT Acknowledgment (TACK) frame, a Short TWT Acknowledgment (STACK) frame, or a Block Acknowledgment TWT (BAT) frame.

5. The apparatus of claim 3, wherein the identification is provided via a field of the control response frame, wherein the field is dependent, at least in part, on a type of the control response frame.

6. The apparatus of claim 3, wherein the identification is provided in a TWT Flow Identifier subfield included in an A1 field in the control response frame.

7. The apparatus of claim 2, wherein the size of the field that carries the identification is at least 3 bits.

8. A method for wireless communications, comprising:
generating a frame comprising timing information for a target wake time (TWT) and an identification of the TWT to which the timing information applies; and
outputting the frame for transmission, wherein the frame is output for transmission outside a previously indicated service period for the TWT identified by the identification.

9. The method of claim 8, wherein the identification is provided via one or more bits of at least one of an address field, a timestamp field, or a field that carries timing information for a TWT in the frame.

10. The method of claim 8, wherein the frame comprises a control response frame.

11. The method of claim 10, wherein the control response frame comprises a TWT Acknowledgment (TACK) frame, a Short TWT Acknowledgment (STACK) frame, or a Block Acknowledgment TWT (BAT) frame.

12. The method of claim 10, wherein the identification is provided via a field of the control response frame, wherein the field is dependent, at least in part, on a type of the control response frame.

13. The method of claim 10 wherein the identification is provided in a TWT Flow Identifier subfield included in an A1 field in the control response frame.

14. An apparatus for wireless communications, comprising:
an interface configured to receive a frame; and
a processing system configured to:
obtain, from the frame, timing information for a target wake time (TWT) and an identification of the TWT to which the timing information applies, and
update a wakeup period for the identified TWT based on the timing information obtained from the frame, wherein the frame is received outside a previously indicated service period for the TWT identified by the identification.

15. The apparatus of claim 14, wherein the processing system is configured to obtain the identification via one or more bits of at least one of an address field, a timestamp field, or a field that carries timing information for a TWT in the frame.

16. The apparatus of claim 14, wherein the frame comprises a control response frame.

17. The apparatus of claim 16, wherein the control response frame comprises a TWT Acknowledgment (TACK) frame, a Short TWT Acknowledgment (STACK), or a Block Acknowledgment TWT (BAT) frame.

18. The apparatus of claim 16, wherein the processing system is configured to obtain the identification via a field of the control response frame, wherein the field is dependent, at least in part, on a type of the control response frame.

19. The apparatus of claim 16, wherein the processing system is configured to obtain the identification in a TWT Flow Identifier subfield included in an A1 field in the control response frame.

20. The apparatus of claim 15, wherein the size of the field that carries the identification is at least 3 bits.

21. A method for wireless communications, comprising:
receiving a frame;
obtaining, from the frame, timing information for a target wake time (TWT) and an identification of the TWT to which the timing information applies; and
updating a wakeup period for the identified TWT based on the timing information obtained from the frame, wherein the frame is received outside a previously indicated service period for the TWT identified by the identification.

22. The method of claim 21, wherein the identification is obtained via one or more bits of at least one of an address field, a timestamp field, or a field that carries timing information for a TWT in the frame.

23. The method of claim 21, wherein the frame comprises a control response frame.

24. The method of claim 23, wherein the control response frame comprises a TWT Acknowledgment (TACK) frame, a Short TWT Acknowledgment (STACK), or a Block Acknowledgment TWT (BAT) frame.

25. The method of claim 23, wherein the identification is obtained via a field of the control response frame, wherein the field is dependent, at least in part, on a type of the control response frame.

26. The method of claim 23, wherein the identification is obtained in a TWT Flow Identifier subfield included in an A1 field in the control response frame.

27. The apparatus of claim 1, further comprising an antenna, wherein the interface is configured to transmit the frame via the antenna, and, wherein the apparatus is configured as an access point.

28. The apparatus of claim 14, further comprising an antenna, wherein the interface is configured to receive the frame via the antenna, and wherein the apparatus is configured as a user terminal.

* * * * *